(12) United States Patent
Sharir et al.

(10) Patent No.: US 6,380,933 B1
(45) Date of Patent: Apr. 30, 2002

(54) GRAPHICAL VIDEO SYSTEM

(75) Inventors: Avi Sharir, Ramat Hasharon; Michael Tamir, Tel-Aviv; Zion Azar, Shoham, all of (IL)

(73) Assignee: Orad Hi-Tec Systems Limited, Kfar Saba (IL)

( * ) Notice: Subject to any disclaimer, the term of this patent is extended or adjusted under 35 U.S.C. 154(b) by 0 days.

(21) Appl. No.: 08/949,633

(22) Filed: Oct. 14, 1997

(30) Foreign Application Priority Data

Apr. 4, 1997 (GB) .............................................. 9706839

(51) Int. Cl.⁷ .............................................. G06T 15/00
(52) U.S. Cl. ...................................................... 345/419
(58) Field of Search ................................. 345/419, 422, 345/423, 426, 427, 440

(56) References Cited

U.S. PATENT DOCUMENTS

| 4,775,946 A | * 10/1988 | Anjyo ......................... 364/522 |
| 5,363,297 A | 11/1994 | Larson et al. ................ 364/410 |

FOREIGN PATENT DOCUMENTS

| EP | 0 669 758 A1 | 8/1995 |
| EP | 0701 369 A1 | 3/1996 |
| EP | 0 773 514 A1 | 5/1997 |
| WO | WO 96/31047 | 10/1996 |

* cited by examiner

*Primary Examiner*—Phu K. Nguyen
(74) *Attorney, Agent, or Firm*—Fish & Richardson P.C.

(57) ABSTRACT

The position of players which may be persons or other objects such as racing cars, sail boats etc. in a sports event is identified and this data is used to create a 3-D image of the event enabling the event to be viewed from any desired angle and also enabling the data to be transmitted to remote viewers enabling the viewers to view the event in 3-D and also to introduce virtual players to compete with real players in the event and to compete with other viewers.

11 Claims, 4 Drawing Sheets

GRAPHICAL VIDEO SYSTEM

The present invention relates to video display of 3-dimensional graphical representations and more particularly to the provision of sporting games in a 3-D graphical format and viewing them in video from any desired viewpoint.

Moreover, the 3-D graphical representation can be used for interactive participation of the viewer in a live sport event and to present to him stereo images of the game.

A known problem with sporting events such as football matches is that storage and transmission of the video of such games requires an enormous amount of storage media and high bandwidth transmission links. It is normal to record such events on video tape and use high bandwidth RF or fibre optical links for transmission. Thus video recording and live transmission of sports events is very popular but has disadvantages.

Firstly, when transmitted the full video requires substantially high bandwidth and is not convenient for real time transmission on low bandwidth media such as telephone lines or the internet.

Secondly, since video is a 2-dimensional representation that does not incorporate location information on objects, the viewpoint cannot be interactively manipulated by a viewer.

U.S. Pat. Nos. 5,189,630 and 5,526,479 describes a live event broadcast with a combination signal that includes a computer coded description of subevents that constitute the event and an audio or visual signal. This system is however only of use in events such as baseball where the number of subevents is limited.

It is an object of the present invention to provide a record and live transmission of a match whilst requiring transmission and recording of substantial less data and whilst providing 3-D information on the objects. (Hereinafter this will be described with reference to a soccer (football) match but it is to be understood that other events such as hockey, rugby football, American football etc are to be included in this invention. Also sports such as sailing, motor racing, cycling etc in which the "players" are individually represented are also included within the definition of players.

It is a further object of the present invention to provide an interactive system enabling manipulation of the match or event by the viewer. In particular it is a specific object to provide means for enabling a viewer to manipulate a game by viewing it from a desired angle, different from the original camera viewpoint at which the given video clip was shot.

Over the Internet different viewers can share the same scene while communicating one with the other; or participating in the game during live transmission.

This match manipulation can be done using recorded highlights of the game or can be done live during the time period that the game is being played.

It is a further object of the present invention to allow for other forms of interactive manipulations like changing players and ball motion tracks or gambling on play patterns.

The present invention provides a system for the video display of 3-dimensional 3-D graphical representations of a live football game including a plurality of players said system comprising location detection means for detecting and providing an output representative of the location of each football player in each frame of a video sequence, object storage means for storing 3-D graphical images of each football player and including combiner means for combining the output of the location detection means and the 3D graphical object storage means to provide a 3-D graphical video display representative of the plurality of football players in their correct position in each frame of the video sequence.

Preferably the system also comprises manipulation means for enabling an operator to select a desired angle of view of the plurality of players.

The present invention also provides means for displaying stereo images to the viewer and means to participate in the live game.

The present invention also provides apparatus for generating live remote video display of 3-dimensional graphical representations of a football match between first and second teams comprising:

video camera means situated at a first location for videoing the football match played on a football pitch at the first location, player determination means situated at the first location for determining the position of at least the football players on the football pitch, apparatus at a second location remote from said first location, said apparatus comprising means for storing graphical images of said football players, low bandwidth transmission link means for transmitting from the first location to the second location the positions of said football players, combination means situated at said second location for combining the location of each football player with a graphical image of the player, and display means for displaying at the second location a 3-D graphical representation of the football match.

The apparatus can be provided with stereo-vision means enabling a viewer to view the game in 3-D vision.

Preferably the apparatus further includes at said first location, or at a third location, remote from both said first and second locations player storage means storing graphical representations of the first and second team on said football pitch and including means for downloading said graphical representations of the first and second teams over said low bandwidth transmission link prior to commencement of the football match.

Preferably the apparatus at said second location comprises manipulation means operative by a viewer and enabling said viewer to select a different angle from which to view the football pitch from the angle of the pitch viewed by the video camera.

The apparatus may be provided with means for allowing a viewer to actively participate in a game. For example, in a motor racing event, the user can "enter" his own car and compete actively in a race against a real competitor.

In a first embodiment the apparatus at the first location comprises means for measuring the camera field of view (FOV) and in which the player determination means comprises manual means for manually identifying the position of the players and a ball on the video image.

In a second embodiment the apparatus at the first location includes pan/tilt/zoom and focus encoders for said video camera for automatic measurement of the FOV.

In a third embodiment the apparatus at the first location includes cooperative means for identifying the location and/or identity of each player, the apparatus including thermal imaging means for identification of the players position on the field.

The thermal imaging means is preferably mounted an the camera and bore-sighted to the FOV of the camera.

The cooperative means also preferably includes a laser scanner cooperating with the thermal imaging means to scan each player and to receive from each player an identification signal generated by cooperative means on each player to identify each player on the pitch.

The low bandwidth transmission means preferably includes means for transmitting the players position and identity to the second location.

The present invention also provides apparatus for generating a video display of 3-dimensional graphical representation of a football match between first and second teams including:

video camera means situated at a first location for videoing from a first angle the football match played on a football pitch at the first location, player determination means situated at said first location for determining the position of at least the football players viewed by said camera on the football pitch, including storage means for storing graphical images of the players, and including manipulation means for manipulating the video image produced by said video camera from said first angle to produce a video display of 3-dimension graphical representations of said football players from a second angle different to said first angle.

Embodiments of the present invention will now be described, by way of example with reference to the accompanying drawings in which.

Figure 5:
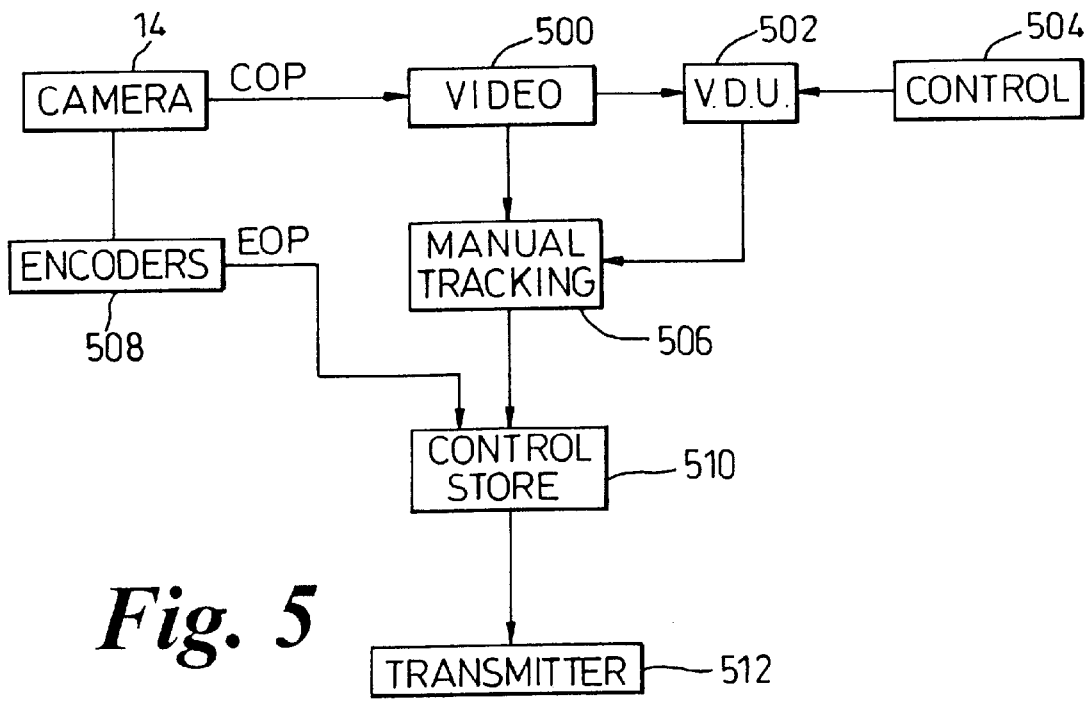
FIG. 5 shows block diagrammatically the circuitry for a second embodiment of the present invention incorporating a degree of manual control and incorporating transmitter means for transmission of an output signal including identification of the position and identity of players.
Figure 6:
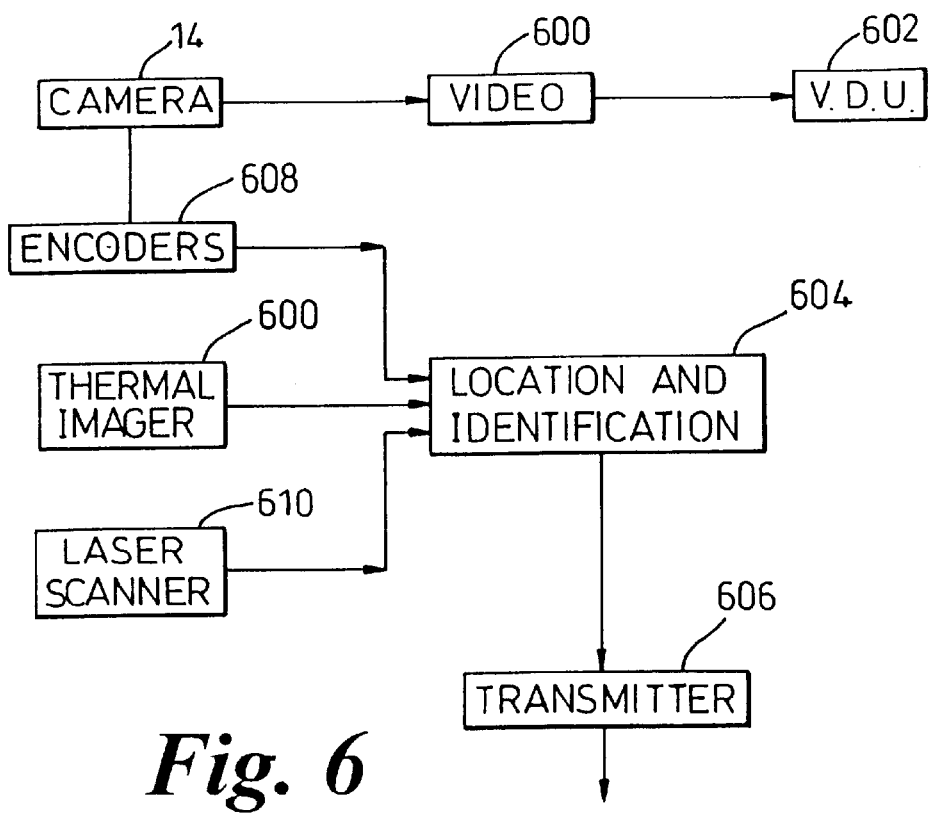
Figure 7:
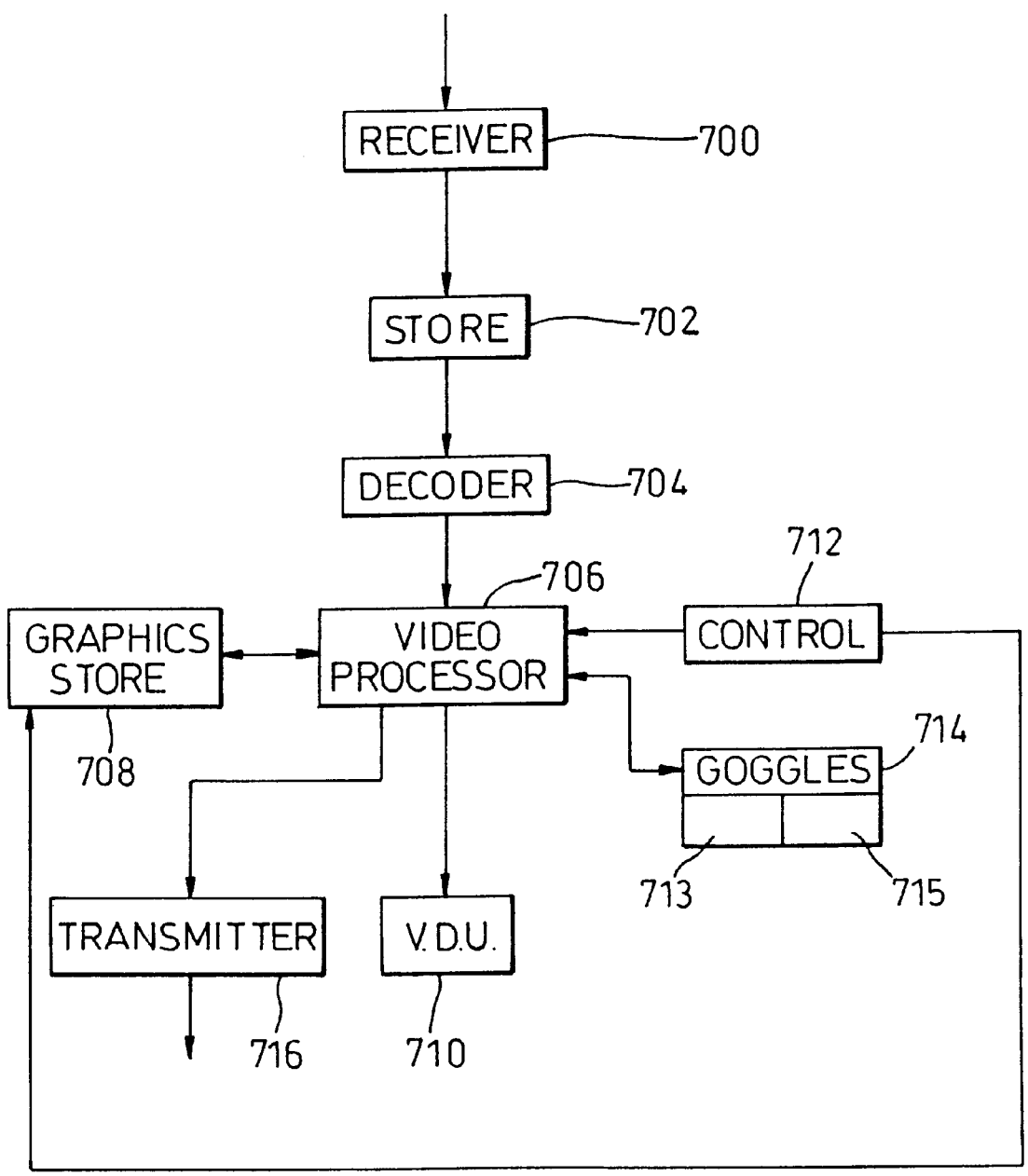

FIG. 6 shows block diagrammatically the circuitry for a third embodiment of the present invention incorporating automatic control and incorporating transmitter means for transmission of an output signal including identification of the position and identity of players; and FIG. 7 shows block diagrammatically simplified receiver circuitry for display and manipulation of the signals transmitted from the circuitry of FIGS. 5 and 6.

The examples are described with reference to a football match but as specified above this is only exemplary and this definition is intended to cover all televised sports events. Thus, references to grounds, ball and referee will apply to similar objects in other sports such as puck, umpire and pitch etc. References to players can also refer to other objects such as boats, racing cars, horses etc.

The present invention has for its principle invention a method and apparatus for producing a 3-D graphical representation of a football match which can be manipulated either after the event or live to provide the viewer with a different view of the game to a TV camera situated in the football ground and in preferred embodiments to enable the remote viewer to select any desired angle to view the match.

Three embodiments of the present will now be described firstly in general and then with reference to specific examples as shown in the drawings.

OFF-LINE FOR MATCH HIGHLIGHTS

The process steps for off-line are as follows:

a) In this embodiment the camera(s) feed(s) is/are recorded on a VCR (Video Cassette Recorder). There is no requirement for any additional equipment on the camera or players.

b) The camera FOV (Field of View) and players/ball tracking is all done on the recorded video. These steps are not performed in real time but are done fast enough to have the game highlights just a short time after the match is over.

This process can be accomplished using image processing techniques and video tracking methods as described in PCT Application No. WO 95/10915, the contents of which are incorporated herein by way of explanation.

c) The camera, players and ball information is now used to locate computer generated models of the players and the ball on a synthetic playing field in the same manner as in virtual Replay as described in the above mentioned PCT application.

d) This now generates a 3-D representation. This means that the camera viewpoint can be dynamically changed throughout the video sequence. the "virtual" camera can "fly around" looking for the best angle to watch the play.

e) The field by field updated information is minimal. Locations of objects, object identity, body direction etc. and this information can easily be transmitted in real time on the Plain Old Telephone System (POTS).

f) Internet Application

This application relates to a remote user with computer access to the Internet.

Firstly, 3D models (stadium, players, ball etc) are loaded into the users computer. Team colours and textures and players characteristics (black/white and possible face images, sky texture etc). According to the users request a given "graphical highlight" is now broadcast in real time to the users computer. In reality the camera and objects location is transmitted over the telephone line and the users computer locates the objects and renders the 3-D scene from a viewpoint which the user selects.

g) Additionally, it is possible for different viewers to communicate with each other and for such individual viewers to participate in the game either alone or in competition with each other.

h) It is also possible by providing individual viewers with 3-D goggles to enable such viewers to obtain stereo vision views of a game.

Graphical Non-Cooperative Live Broadcast a) In this embodiment the camera is equipped with pan/tilt/zoom/focus encoders on the camera mount and on the lens to measure the FOV direction and magnitude.

b) the tracking of players and ball is done manually as explained hereinafter.

Graphical Cooperative Live Broadcast a) In this embodiment manual intervention is eliminated by using a thermal imager; laser scanner and players units as described hereinafter.

GENERAL DESCRIPTION

In order to derive the instantaneous locations in space of players and the ball, the following steps should be taken.

1. The instantaneous direction and magnitude of the camera field of view is measured or calculated. In the case of a moving camera (crane) seven parameters should be measured, x,y,z,pan, tilt, roll and zoom (focal length). In case of a fixed camera (most cameras in football are stationary) only pan, tilt, roll and zoom are required. Roll is usually negligible, so we remain with pan, tilt and zoom. These parameters can be measured in a number of ways:
   a) by attaching encoders (or other sensors) to the pan and tilt axes of the camera mount and on the zoom and focus motors;
   b) using pattern recognition and video tracking methods—assigning landmarks in the arena etc.

Such systems are known from the above mentioned PCT application and also from U.S. Pat. No. 5,543,856 (Rosser) which is also incorporated herein by way of explanation.

2. Objects on the field (players and ball) should be tracked (and identified) independently. This can also be done in several ways:
   a) using video tracking methods on the video recorded from the normal stadium cameras, as described in the above mentioned PCT application. The disadvantage is reliability. When the player is on a complex background, or when he is occluded by other players, the automatic tracking is not reliable and one needs manual override. This is why this method can be used only in post-production for the match highlights,
   b) real-time manual tracking of the players and ball using a calibrated theodolite or another pan/tilt unit with a projected reticle. The reticle is placed on the player and the player is tracked manually. A human tracker is required per each tracked object. Since each operator tracks just one object, identification is easy,
   c) real-time automatic tracking and identification using a thermal imager boresighted on the stadium camera (since thermal contrasts are larger than the contrasts in the visible spectrum). For identification a laser scanner that "visits" each of the blobs detected by the thermal imager. A device is required on each player consisting of an electro-optical receiver and an RF transmitter that transmits the identity of the player to an RF receiver.
   d) combinations of b and c are possible, like automatic tracking of players, manual tracking the ball.

3. When you have the camera's field of view direction and magnitude and tracking result of the players and the ball, it is still not enough because the tracking results are just directions. You now have to make the (correct) assumption that the playing field is a plane. Then the 3-D graphical representation of the football match can be created.

Figure 1:
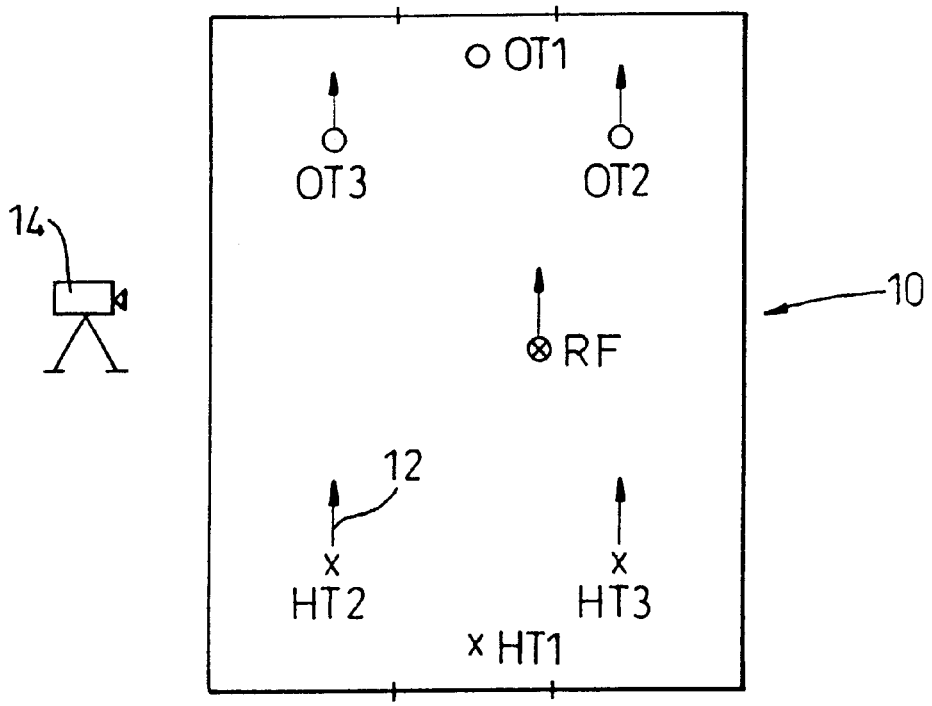
FIG. 1 shows schematically a football pitch with opposing teams.

With reference now to the drawings in FIG. 1, a football pitch 10 is shown with opposing teams OT1 ... OT3 and HT1 ... HT3 and a referee RF. Each player (including the referee) has a position on the pitch 10 and also a direction of movement indicated by arrow 12, as shown also in FIG. 2.

Figure 2:
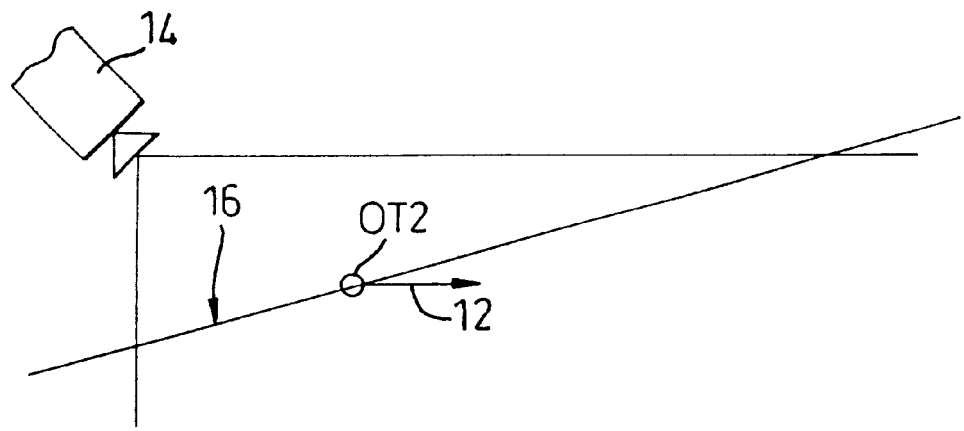
FIG. 2 shows schematically a video camera overlooking a football pitch and illustrating the principles of the present invention.

The video camera 14 which is mounted to video the game is usually mounted, as shown in FIG. 2 above, the pitch and "looks" down on the pitch. The computer program for the system assumes, correctly in most instances, that the pitch is a plane surface 16. This assumption enables the players to be correctly positioned on that plane surface 16.

Figure 3:
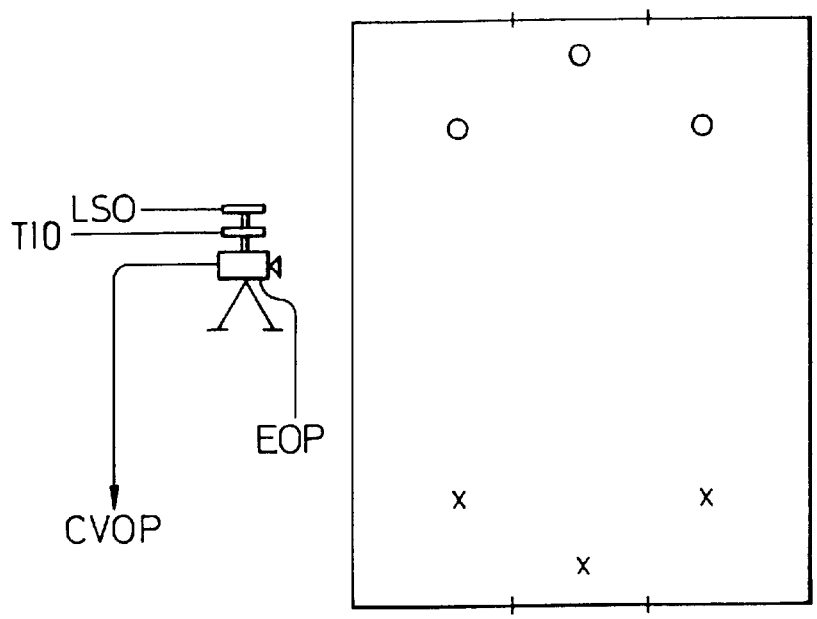
FIG. 3 shows schematically the football pitch of FIG. 1, together with a video camera and illustrating various output signals useful in three embodiments of the present invention.

With reference now to FIG. 3, in the three embodiments different outputs are required from the camera and other encoders.

In the first embodiment only the camera video output CVOP is used, as explained with reference to FIG. 4. The camera output is fed to a VCR 400 where the game is recorded for subsequent display on a VDU 402. The game displayed on the VDU 402 is selectively sampled to select highlights showing specific interesting sequences. Once these have been selected the control unit 404 can be used to provide the necessary player and ball positioning information and player identity. The control unit 404 may be a mouse type arrangement or could be a touch sensitive screen on the VDU or a light pen arrangement. All that is necessary is to be able to track each player manually. Once a player has been identified, as explained above, the player can be tracked by known means, manual intervention only being required once a player moves out of the video sequence or is hidden by other players etc.

For each sequence the position and identity of each player/ball is stored throughout the sequence in tracking store 406.

In a graphics computer 408 such as for example the complete 3-D video sequence is composed by mixing the position/identity information with a 3-D graphic image stored in a store 40.

The identity of each team-uniform, player identify etc can be input via input control 412 so that the completed data output from computer 408 comprises player position, identity and direction of movement of each player. This can be stored in store 414 and displayed for checking on VDU 416.

Since the data stored in store 414 is 3-D graphic information the viewing angle can be adjusted using a control 418. This may be a joystick or other suitable control.

The completed information can be transmitted 415 from store 414 either with or without the graphic data relating to player identity as now explained with reference to FIGS. 5 and 6.

In FIG. 5, again the video output from camera 14 is fed to a VDU 502 via a video buffer store 500. The system is proposed to operate in real-time and is described with reference to a single player. For tracking of several players the system control may be duplicated.

Figure 4:
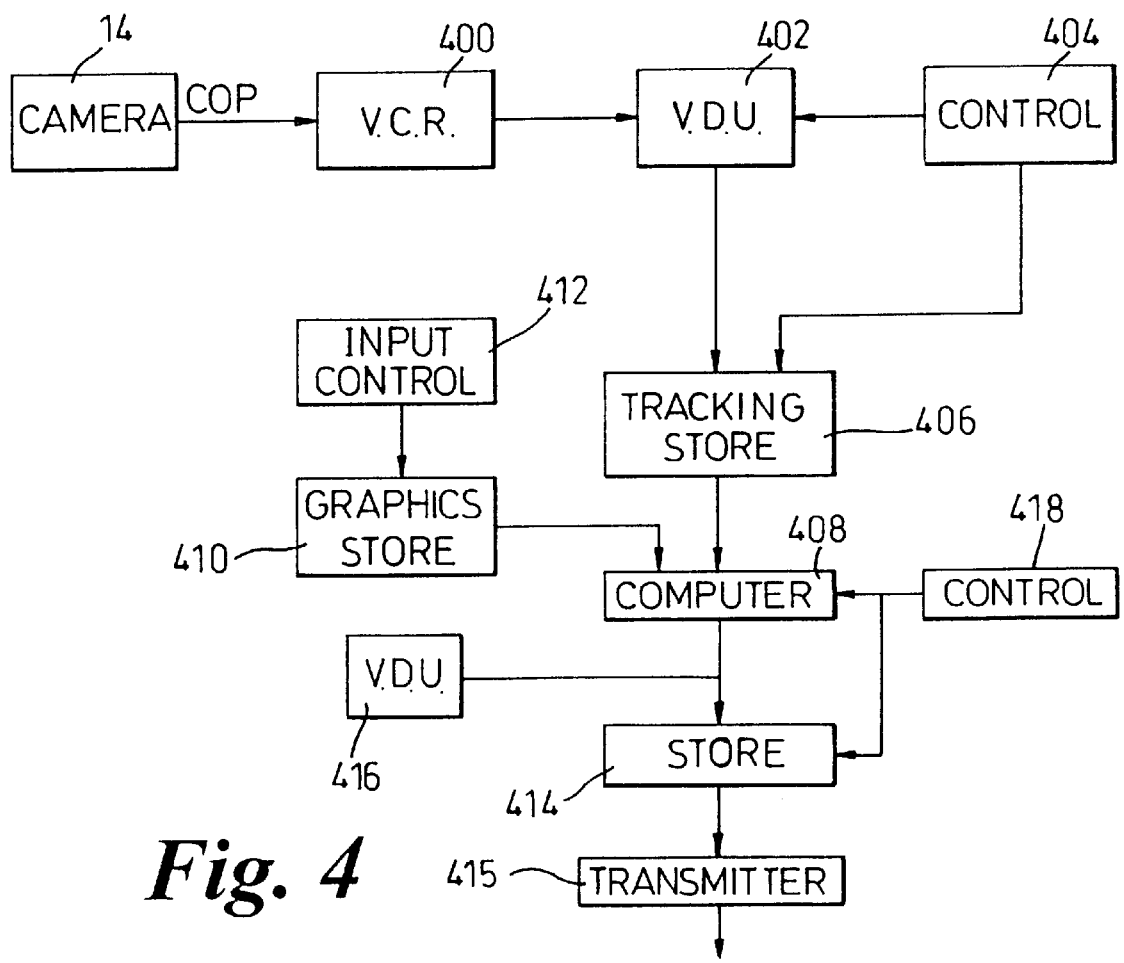
FIG. 4 shows block diagrammatically the circuitry for a first embodiment of the present invention utilising complete manual control and incorporating transmitter means for transmitting output information.

Each player is identified on a VDU 502 by a control 504 which as in FIG. 4 may be a touch screen on the VDU, a mouse etc. This can be done in real-time for a single player.

The information is stored in a manual tracking store 506.

Each camera is provided with encoders 508 which give an encoder output EOP to store 510 where it is combined with the manual identity/position of each player. The output of control store 510 therefore comprises the identity and position of each player and then is transmitted by transmitter 512 to a viewer/internet user as described hereinafter with reference to FIG. 7. The data transmitted may be readily transmitted on a low bandwidth medium such as a telephone line.

In FIG. 7 the transmitted data is received by any suitable receiving apparatus 700 and stored in a buffer store 702 and decoded, as necessary in decoder 704. In a video processor 706 the position/identity information is combined with 3-D graphical information stored in store 708. This store contains graphical data relating to each team and possibly each player which has been downloaded prior to the live game. The output of the processor 706 can be displayed on a VDU 710 for the enjoyment of the viewer. Since the information in processor 706 is a 3-D graphical representation, the angle of view can be selected by the viewer using a control 712.

With reference now to FIG. 6, a more automated system is described.

The camera output is still fed to a video circuit 600 and to a VDU 602 for local viewing and for control functions such as quality control at the game. The video output is not however required in this embodiment for identification and location of the players. This is done using the camera encoders 508 (FIG. 5) in conjunction with the output of a thermal imager 600 which is used to identify the position of each player on the pitch using the thermal output of each player.

Once a map of the location of each player has been identified the identity of each player can be determined by using a laser scanner 602. This can scan the entire pitch or by use of information provided by imager 600 can be interrogated only when it scans a position where a player has been identified. Each player is provided with an optical/RF transponder which identifies each player.

Thus into a location and identifier unit 604 the identity, and location, of each player is input and this data can be transmitted by transmitter 606 to the user/viewer as exemplified in FIG. 7.

The embodiments of FIG. 6 requires no manual input and can transmit in real-time sufficient data to enable an internet user to generate a 3-D graphical representation of a football match (as defined). The user/viewer can then select a desired angle of view.

STEREO VISION

The data transferred to each viewer can be used to provide the viewer with 3-D views. In the viewer side the 3-D information can be used to display 3 dimensional images using colour filter LCD shutter goggles 714 with first and second eye pieces 713,715. In this case the computer of the viewer presents different images to each eye; for example to the right eye every even video field the computer draws the image as should be seen from the right eye and on every odd video field the computer draws the image corresponding to the left eye. The colour filter goggles allows the viewer's right eye to see only the even field and the left eye see only the odd fields, thus creating 3-D images.

INTERACTIVE LIVE-GAME

The system computer has all the information about the location of the real players in the field and transmits this information to the viewer location for presenting 3-D graphics. In the viewer side he can communicate with other viewers via a transmitter 716 to share with them the same scene and his views. Moreover he can also participate in the game. For example, in Formula 1 racing the viewer receives the live transmission of the race in 3-D graphical representation on his screen He can have his own car provided by the graphics computer control of the control 712 and compete against the world champion drivers. The 3-D objects can have collision detectors, proximity detectors . . . , to comply with the game rules. In a second example in a golf game the viewer can compete against one of the players.

What is claimed is:

1. Apparatus for generating live remote video display of 3-dimensional graphical representations of a football match between first and second teams on a football pitch at a first location, comprising:

player determination means situated at the first location for determining the positions of at least the football players on the football pitch, a memory disposed at a second location remote from said first location for storing downloaded three-dimensional (3D) graphical representations of said football players, apparatus disposed at said first location, or at a third location remote from both said first and second locations, including storage for storing 3D graphical representations of the players of the first team and the players of the second team, and means for downloading said 3D graphical representations of the players of the first team and the players of the second team to said memory at the second location over a low bandwidth transmission link prior to commencement of the football match, means for transmitting the positions of said football players from the first location to the second location over a low bandwidth transmission link in real time during the match, combination means situated at said second location for combining the positions of said football players transmitted over the low bandwidth transmission link with the 3D graphical representations of the players downloaded into said memory to produce a real time 3D graphical representation of the football match, and display means at the second location for displaying the 3-D graphical representation of the football match produced by the combination means.

2. Apparatus as claimed in claim 1 further comprising a video camera at the first location for videoing the football match, and in which the apparatus at said second location comprises manipulation means operative by a viewer and enabling said viewer to select a different angle from which to view the football pitch from the angle of the pitch viewed by the video camera.

3. Apparatus as claimed in claim 2 including means for enabling a viewer to introduce 3D graphical representations of further players from said memory, and comprising means for controlling said further players to compete with the players whose positions are transmitted from said game.

4. Apparatus as claimed in claim 3 in which said further players comprise racing cars.

5. Apparatus as claimed in claim 2 including transmitter means enabling each viewer to communicate with other viewers to enable each viewer to compete with other viewers.

6. Apparatus as claimed in any one of claims 1 and 5 to further comprising a video camera at the first location for videoing the football match, and in which the apparatus at the first location comprises means for measuring the camera field of view (FOV) and in which the player determination means comprises manual means for manually identifying the position of the players and a ball on the match.

7. Apparatus as claimed in any one of claimed 1 to 4 further comprising a video camera at the first location for videoing the football match, and in which the apparatus at the first location includes pan/tilt/zoom and focus encoders for said video camera for automatic measurement of the FOV.

8. Apparatus as claimed in any one of claims 1 to 4 in which the apparatus at the first location includes cooperative means for identifying the position and/or identity of each player, the apparatus including thermal imaging means fro identification of the player's position on the pitch.

9. Apparatus as claimed in claim 8 further comprising a video camera at the first location for videoing the football match, and in which the thermal imaging means is mounted on the camera and bore-sighted to the FOV of the camera.

10. Apparatus as claimed in claim 9 in which the cooperative means also includes a laser scanner cooperating with the thermal imaging means to scan each player and to receive from each player an identification signal generated by cooperative means on each player to identify each player on the pitch.

11. Apparatus as claimed in claim 1 in which the means for transmitting includes means for transmitting the players' positions and identities to the second location.

\* \* \* \* \*

UNITED STATES PATENT AND TRADEMARK OFFICE
CERTIFICATE OF CORRECTION

PATENT NO.    : 6,380,933 B1
DATED         : April 30, 2002
INVENTOR(S)   : Zion Azar, Avi Sharir and Michael Tamir It is certified that error appears in the above-identified patent and that said Letters Patent is hereby corrected as shown below:

Column 8,
Line 36, replace "1 and 5" with -- 1 to 5 --.
Lines 43 and 48, replace "1 to 4" with -- 1 to 5 --.

Signed and Sealed this

Twenty-second Day of July, 2003

JAMES E. ROGAN
*Director of the United States Patent and Trademark Office*